United States Patent
Park et al.

(10) Patent No.: US 9,829,952 B2
(45) Date of Patent: Nov. 28, 2017

(54) PROCESSOR THAT HAS ITS OPERATING FREQUENCY CONTROLLED IN VIEW OF POWER CONSUMPTION DURING OPERATION AND SEMICONDUCTOR DEVICE INCLUDING THE SAME

(71) Applicant: SAMSUNG ELECTRONICS CO., LTD., Suwon-si, Gyeonggi-do (KR)

(72) Inventors: Chan-Wook Park, Seongnam-si (KR); Se-Ho Kim, Anyang-si (KR); Young-Gwan Kim, Seoul (KR); Taek-Hyun Kim, Seongnam-si (KR); Jung-Min Oh, Seoul (KR); I-Saac Hong, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 1 day.

(21) Appl. No.: 14/843,768

(22) Filed: Sep. 2, 2015

(65) Prior Publication Data

US 2016/0147277 A1    May 26, 2016

(30) Foreign Application Priority Data

Nov. 24, 2014 (KR) .................. 10-2014-0164496

(51) Int. Cl.
  G06F 1/32    (2006.01)
  G06F 1/20    (2006.01)

(52) U.S. Cl.
  CPC ............ G06F 1/3206 (2013.01); G06F 1/206 (2013.01); G06F 1/324 (2013.01); Y02B 60/1217 (2013.01); Y02B 60/1275 (2013.01); Y02B 60/32 (2013.01)

(58) Field of Classification Search
  CPC ...... G06F 1/3203; G06F 1/3206; G06F 1/324; G06F 1/3296
  USPC .................................... 713/320, 322
  See application file for complete search history.

(56) References Cited

U.S. PATENT DOCUMENTS

| 5,996,084 | A | 11/1999 | Watts |
| 7,028,211 | B2 | 4/2006 | Mantani |
| 8,296,596 | B2 | 10/2012 | Tu |
| 8,631,262 | B2 | 1/2014 | Park |
| 8,869,152 | B1 * | 10/2014 | Abrishami ............ G06F 1/324 713/300 |

(Continued)

FOREIGN PATENT DOCUMENTS

| JP | 2008-107944 | 5/2008 |
| JP | 2010-277350 | 12/2010 |

(Continued)

*Primary Examiner* — Chun Cao
(74) *Attorney, Agent, or Firm* — F. Chau & Associates, LLC

(57) ABSTRACT

A processor and a semiconductor device including the same are provided. The processor includes an operation unit, an operation counter which measures a first operation pattern by counting first operations of the operation unit and measures a second operation pattern by counting second operations of the operation unit which are different from the first operations, a power measurement unit which calculates power consumption of the operation unit using a first weight for the first operation pattern and a second weight for the second operation pattern, and a frequency controller which adjusts an operating frequency used for the first or second operations by using the calculated power consumption.

20 Claims, 19 Drawing Sheets

(56) References Cited

U.S. PATENT DOCUMENTS

| | | | | |
|---|---|---|---|---|
| 9,026,822 | B2* | 5/2015 | Miwa | G06F 1/3225 |
| | | | | 713/320 |
| 2012/0146708 | A1* | 6/2012 | Naffziger | G06F 1/206 |
| | | | | 327/512 |
| 2013/0155073 | A1* | 6/2013 | Khodorkovsky | G06F 3/14 |
| | | | | 345/501 |
| 2013/0328890 | A1* | 12/2013 | Avkarogullari | G06F 1/3234 |
| | | | | 345/501 |
| 2014/0063026 | A1 | 3/2014 | Oh | |
| 2014/0068285 | A1 | 3/2014 | Lee et al. | |
| 2015/0089162 | A1* | 3/2015 | Ahsan | G06F 13/1663 |
| | | | | 711/147 |
| 2016/0034528 | A1* | 2/2016 | Roy | G06F 17/30 |
| | | | | 707/736 |

FOREIGN PATENT DOCUMENTS

| | | |
|---|---|---|
| JP | 2011-018163 | 1/2011 |
| JP | 2013-012003 | 1/2013 |
| JP | 2013-093052 | 5/2013 |
| KR | 10-2010-0046414 | 5/2010 |
| KR | 10-2014-0030823 | 3/2014 |

* cited by examiner

1200

1300

1400

PROCESSOR THAT HAS ITS OPERATING FREQUENCY CONTROLLED IN VIEW OF POWER CONSUMPTION DURING OPERATION AND SEMICONDUCTOR DEVICE INCLUDING THE SAME

This application claims under 35 U.S.C. 119 priority to and the benefit of Korean Patent Application No. 10-2014-0164496 filed on Nov. 24, 2014 in the Korean Intellectual Property Office, the entire contents of which are incorporated by reference herein.

BACKGROUND

1. Technical Field

The present disclosure relates to a processor and a semiconductor device including the same.

2. Description of the Related Art

Graphics performance and power are important elements of a mobile device such as a mobile phone. To save power consumed by the mobile device, utilization data of a processor, such as a central processing unit (CPU), a graphics processing unit (GPU), or an application processor (AP), is collected in real time. The operating frequency of the processor can then be increased when the utilization of the processor is high and decreased when the utilization of the processor is low. Here, the utilization of the processor is simply measured as a ratio of an active section and an idle section of the processor (e.g., the GPU).

However, the power consumption of the processor during operation is not simply proportional to the utilization of the processor. Therefore, when the power consumption of the processor during operation is low, the operating frequency of the processor can be increased in some cases.

SUMMARY

Aspects of the present disclosure provide a processor which controls an operating frequency in view of power consumption during operation in real time.

Aspects of the present disclosure also provide a semiconductor device which controls the operating frequency in view of the power consumption during operation in real time.

However, aspects of the present disclosure are not restricted to the ones set forth herein. The above and other aspects of the present disclosure will become more apparent to one of ordinary skill in the art to which the present disclosure pertains by referencing the detailed description of the present disclosure given below.

According to an aspect of the present disclosure, there is provided a processor including an operation unit, an operation counter which measures a first operation pattern by counting first operations of the operation unit and measures a second operation pattern by counting second operations of the operation unit which are different from the first operations, a power measurement unit which calculates power consumption of the operation unit using a first weight for the first operation pattern and a second weight for the second operation pattern, and a frequency controller which adjusts an operating frequency used for the first or second operations by using the calculated power consumption.

According to another aspect of the present disclosure, there is provided a processor including an operation unit, a section counter which measures an active section and an idle section of the operation unit, a utilization measurement unit which calculates an operating rate of the operation unit using a result value of the section counter, and a frequency controller which adjusts an operating frequency of the operation unit using the operating rate. The frequency controller sets the operating frequency to any one of first through N-th frequencies. The frequency controller changes the operating frequency to the N-th frequency which is a maximum operating frequency of the operation unit when power consumption of the operation unit is less than threshold power consumption. The frequency controller changes the operating frequency to the (N−1)-th frequency which is less than the N-th frequency when the power consumption of the operation unit is greater than the threshold power consumption and when the operating frequency is the N-th frequency, where N is a natural number.

According to still another aspect of the present disclosure, there is provided a semiconductor device including a processor, and a processor power meter which measures first power consumption which is measured power consumption of the processor. The processor includes a section counter which measures an active section and an idle section of the processor, a utilization measurement unit which calculates an operating rate of the processor using a result value of the section counter, and a frequency controller which adjusts an operating frequency of the processor using the operating rate and the first power consumption.

BRIEF DESCRIPTION OF THE DRAWINGS

The above and other aspects and features of the present disclosure will become more apparent by the description of exemplary embodiments thereof with reference to the attached drawings, in which.

DETAILED DESCRIPTION

Figure 1:
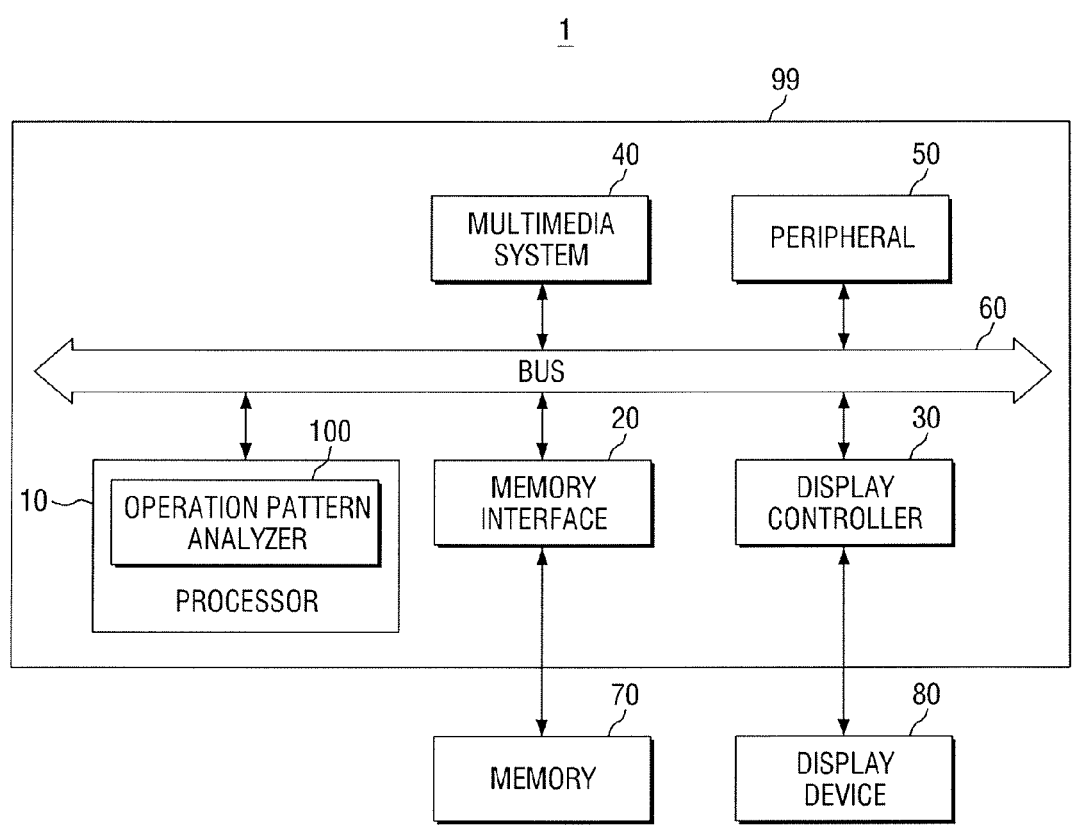
FIG. 1 is a block diagram of a processor including an operation pattern analyzer and a semiconductor device including the processor according to an exemplary embodiment of the present disclosure.

The present inventive concept may, however, be embodied in many different forms and should not be construed as being limited to the exemplary embodiments set forth herein. Rather, these exemplary embodiments are provided so that this disclosure will be thorough and complete and will fully convey the concept of the present disclosure to those skilled in the art, and the present disclosure will only be defined by the appended claims. Like reference numerals refer to like elements throughout the specification.

The terminology used herein is for the purpose of describing particular exemplary embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, and the like, may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments are described herein with reference to cross-section illustrations that are schematic illustrations of idealized exemplary embodiments (and intermediate structures). As such, variations from the shapes of the illustrations as a result, for example, of manufacturing techniques and/or tolerances, are to be expected. Thus, these exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Processors and semiconductor devices including the same according to exemplary embodiments of the present disclosure will now be described with reference to FIGS. 1 through 19.

FIG. 1 is a block diagram of a processor 10 including an operation pattern analyzer 100 and a semiconductor device 1 including the processor 10 according to an exemplary embodiment of the present disclosure.

Referring to FIG. 1, the semiconductor device 1 according to the current exemplary embodiment includes a system on chip (SoC) 99, a memory 70, and a display device 80.

The system on chip 99 may include the processor 10, a memory interface 20, a display controller 30, a multimedia system 40, a peripheral circuit 50, and a bus 60.

The processor 10 may perform operations needed to drive the SoC 99. In some exemplary embodiments of the present disclosure, the processor 10 may have a multicore environment including multiple cores. The processor 10 may include, but not be limited to, a graphics processing unit (GPU), a central processing unit (CPU), or an application processor (AP).

The memory interface 20 may provide an environment necessary for connecting the processor 10 to an external memory (e.g., the memory 70), and may operate at high speed. In some exemplary embodiments of the present disclosure, the memory interface 20 may include a controller (e.g., a memory controller) for controlling the external memory (e.g., the memory 70).

The display controller 30 may control the display device 80 for displaying a rendered image frame.

The multimedia system 40 may be used by the SoC 99 to perform various multimedia functions. The multimedia system 40 may include a 3D engine module, a video codec, a display system, a camera system, and a post-processor.

The peripheral circuit 50 may provide an environment necessary for smoothly connecting the SoC 99 to an external device (e.g., a mainboard). Accordingly, the peripheral circuit 50 may include various interfaces that enable external devices connected to the SoC 99 to be compatible with the SoC 99.

The bus 60 may be used by the processor 10, the memory interface 20, the display controller 30, the multimedia system 40 and/or the peripheral circuit 50 to perform data communication with each other. The bus 60 is a path for transmitting data. In some exemplary embodiments of the present disclosure, the bus 60 may have a multilayer structure. Specifically, the bus 60 may be, but is not limited to, a multilayer Advanced High-performance Bus (AHB) or a multilayer Advanced eXtensible interface (AXI).

The memory 70 may function as a working memory needed for the operation of the processor 10. In some exemplary embodiments of the present disclosure, the memory 70 may be disposed outside the processor 10 as illustrated in the drawing. Specifically, the memory 70 may be packaged with the processor 10 in the form of package on package (PoP). In addition, the memory 70 may be implemented inside or outside the processor 10. The memory 70 may include one or more volatile memories such as a double data rate synchronous dynamic random access memory (DDR SDRAM) or a single data rate SDRAM (SDR SDRAM) and/or one or more nonvolatile memories such as an electrically erasable programmable read-only memory (EEPROM) or a flash memory.

The above-described processor 10 may include the operation pattern analyzer 100. The operation pattern analyzer 100 may analyze an operation pattern of the processor 10. For example, the operation pattern analyzer 100 may collect an operation pattern for each of different operations performed by the processor 10. In addition, the operation pattern analyzer 100 may calculate the power consumption of the processor 10 using each of the collected operation patterns, and may control an operating frequency or voltage of the processor 10 using the calculated power consumption. This will be described in more detail later.

Figure 2:
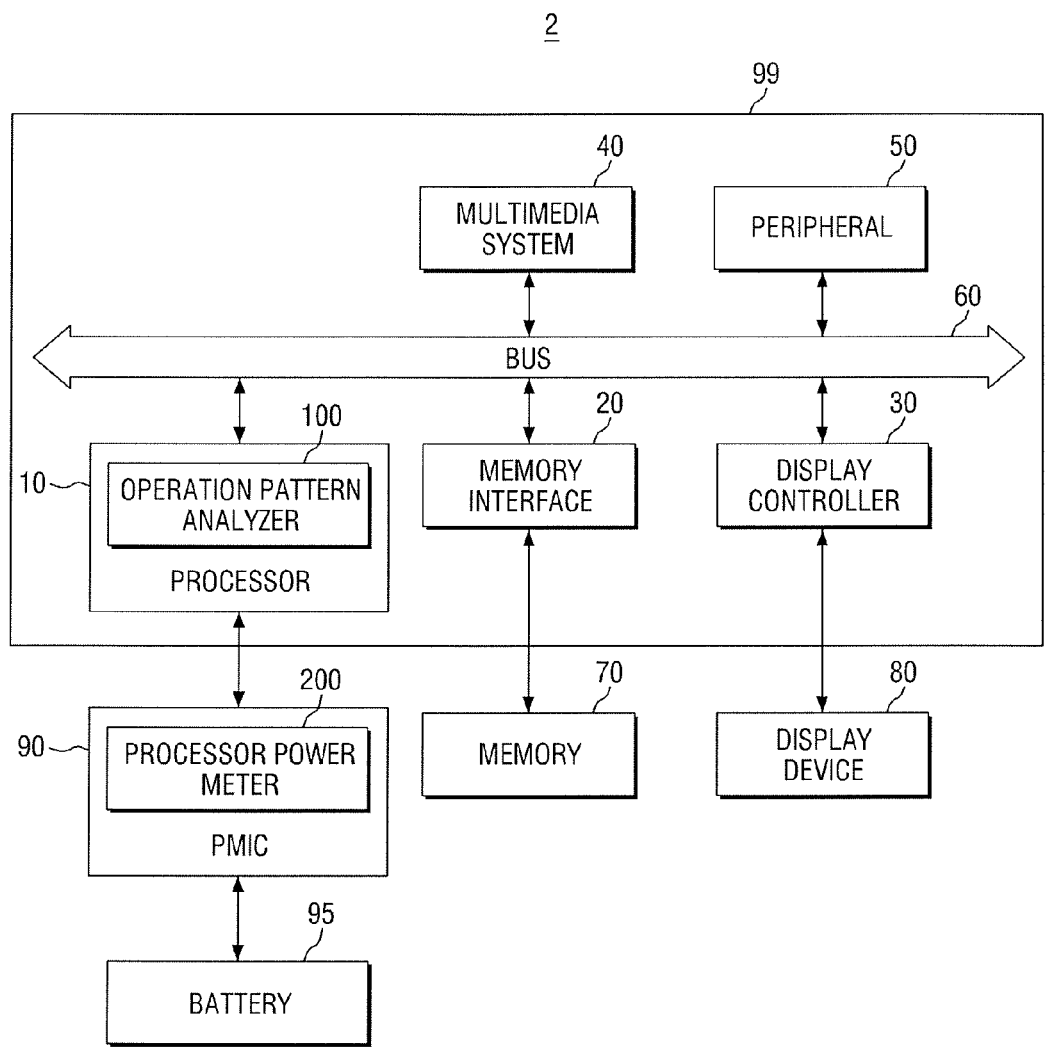
FIG. 2 is a block diagram of a processor including an operation pattern analyzer and a semiconductor device including the processor according to another exemplary embodiment of the present disclosure.

FIG. 2 is a block diagram of a processor 10 including an operation pattern analyzer 100 and a semiconductor device 2 including the processor 10 according to another exemplary embodiment of the present disclosure. For simplicity, a description of elements substantially identical to those of the previous exemplary embodiment will be omitted, and the current exemplary embodiment will hereinafter be described, focusing mainly on differences with the pervious exemplary embodiment.

Referring to FIG. 2, the semiconductor device 2 according to the current exemplary embodiment may include an SoC 99, a memory 70, a display device 80, a power management integrated circuit (PMIC) 90, and a battery 95.

The PMIC 90 is a power control module including a discrete power element module, a high-voltage power circuit, a low-voltage digital circuit, and high- and low-voltage analog circuits. The PMIC 90 may include two chips or one chip. The PMIC 90 may convert, distribute, charge and control power supplied to an electronic device according to the electronic device. Therefore, high resistance to pressure and high reliability are required of the PMIC 90, as compared with a general semiconductor.

In addition, the PMIC 90 needs a low-capacity nonvolatile memory in order to perform an analog trimming function. A nonvolatile memory to be embedded may be an electrical fuse one-time programmable memory (eFuse OTP) that can be designed based upon a logic process which does not require any additional processes.

With the development of battery-based mobile information devices, a power semiconductor-based PMIC which can efficiently control and manage limited battery resources is becoming very important. The PMIC may integrate various control and management functions into one chip, thereby saving space and cost. Therefore, the PMIC becomes a core part of a battery-based mobile information device.

The PMIC 90 may supply power into the SoC 99. The PMIC 90 may include a processor power meter 200. The processor power meter 200 may actually measure the power supplied to the processor 10 within the SoC 99. That is, the processor power meter 200 may actually measure the power consumption of the processor 10.

The operation pattern analyzer 100 may control the operating frequency or voltage of the processor 10 using the power consumption measured by the processor power meter 200. This will be described in more detail later.

Figure 3:
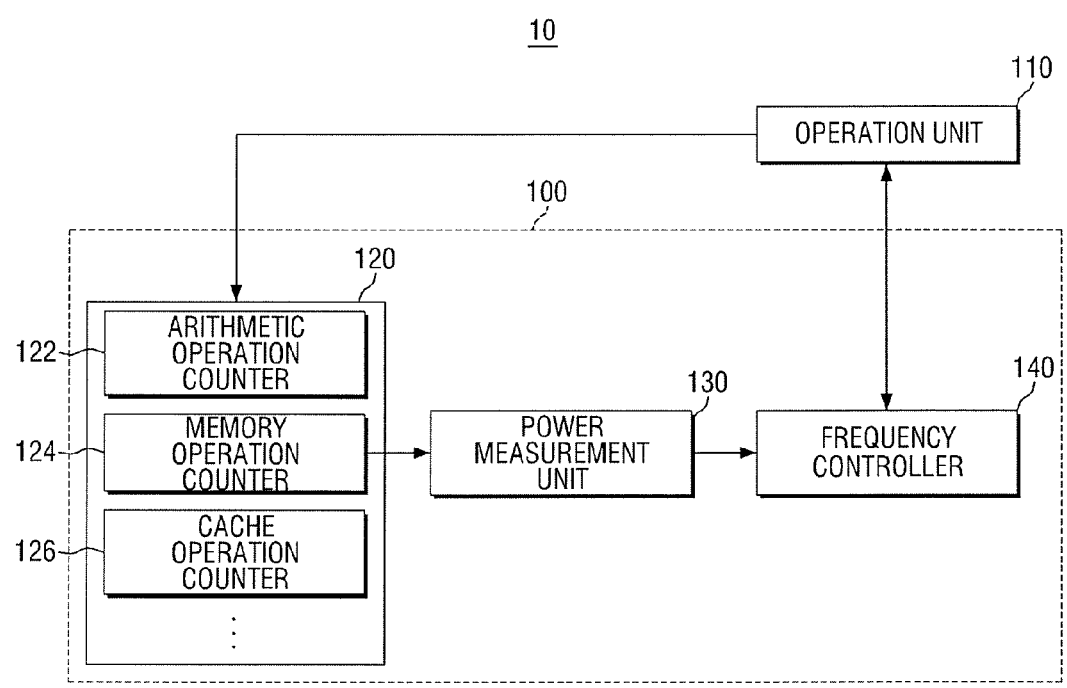
FIG. 3 is a block diagram of a processor according to an exemplary embodiment of the present disclosure.
Figure 4:
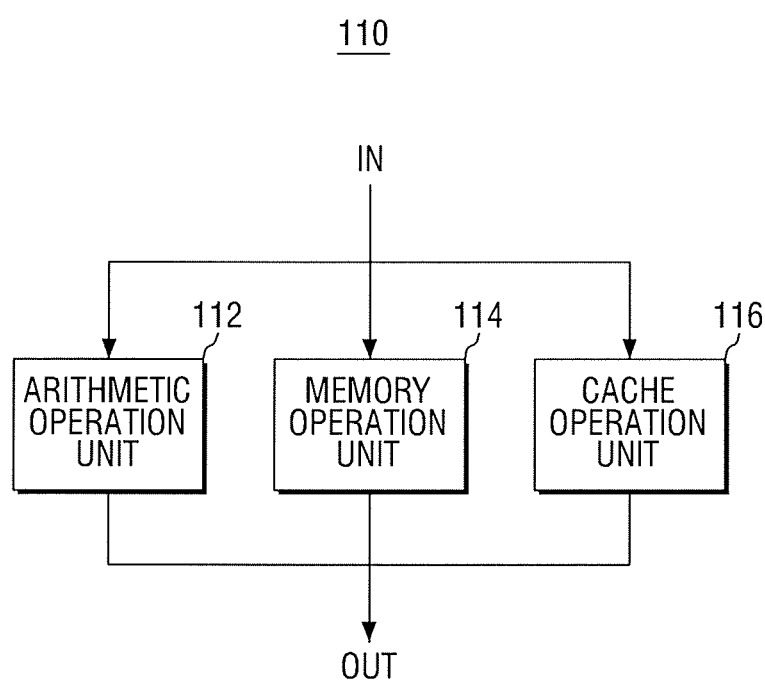
FIG. 4 is a block diagram of an operation unit according to exemplary embodiments of the present disclosure.
Figure 5:
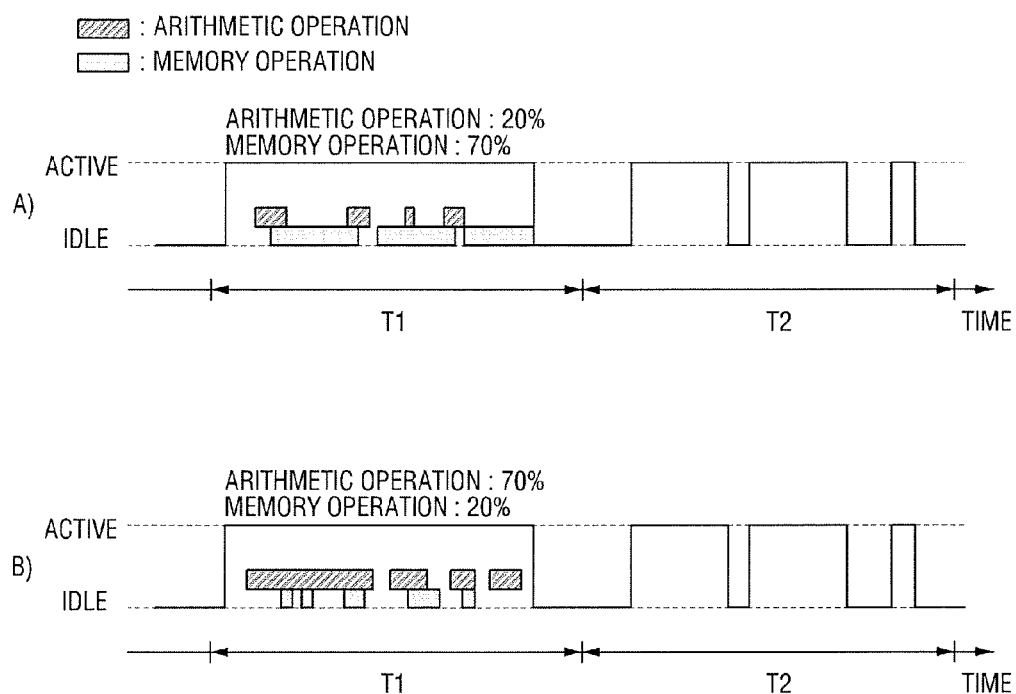
FIG. 5 is a diagram illustrating the operation of an operation pattern analyzer according to exemplary embodiments of the present disclosure.

FIG. 3 is a block diagram of a processor 10 according to an exemplary embodiment of the present disclosure. FIG. 4 is a block diagram of an operation unit 110 according to exemplary embodiments of the present disclosure. FIG. 5 is a diagram illustrating the operation of an operation pattern analyzer 100 according to exemplary embodiments of the present disclosure.

Referring to FIG. 3, the processor 10 according to the current exemplary embodiment may include an operation unit 110 and an operation pattern analyzer 100. The operation pattern analyzer 100 may include an operation counter 120, a power measurement unit 130, and a frequency controller 140.

Referring to FIGS. 3 and 4, the operation unit 110 may perform operations needed to drive the processor 10. The operation unit 110 may have a multicore environment including multiple cores. In addition, the operation unit 110 may process various types of instructions. For example, the operation unit 110 may perform an arithmetic operation, a memory operation, and a cache operation.

Specifically, the operation unit 110 may include an arithmetic operation unit 112, a memory operation unit 114, and a cache operation unit 116. The arithmetic operation unit 112, the memory operation unit 114, and the cache operation unit 116 may be connected by a parallel pipeline. The arithmetic operation unit 112, the memory operation unit 114, and the cache operation unit 116 may process different instructions.

More specifically, the arithmetic operation unit 112 may perform an arithmetic operation (e.g., four fundamental arithmetic operations such as addition, subtraction, multiplication, and/or division performed by regarding the object of an operation as numerical data) within the processor 10. The memory operation unit 114 may perform a memory operation (e.g., a data read or write operation or a data load or store operation) within the processor 10. The cache operation unit 116 may perform a cache operation of executing an instruction for a cache. However, the present disclosure is not limited thereto. In some cases, the cache operation unit 116 can be omitted.

The arithmetic operation unit 112, the memory operation unit 114, and the cache operation unit 116 may consume different amounts of power in their respective operations. In addition, the arithmetic operation unit 112, the memory operation unit 114, and the cache operation unit 16 may operate in different operation patterns. For example, the arithmetic operation unit 112 may perform a first operation in a first operation pattern, and the memory operation unit 114 may perform a second operation in a second operation pattern. Here, the amounts of power consumed by the arithmetic operation unit 112 and the memory operation unit 114 may be different. As will be described in more detail later, the power measurement unit 130 may calculate the power consumption of the operation unit 110 by using a weight for the amount of the power consumption for each operation pattern. The power consumption calculated by the power measurement unit 130 may be used to adjust the operating frequency of the processor 10.

Referring back to FIG. 3, the operation counter 120 may measure a first operation pattern by counting first operations of the operation unit 110, and may measure a second operation pattern by counting second operations of the operation unit 110 which are different from the first operations.

Specifically, the operation counter 120 may include an arithmetic operation counter 122, a memory operation counter 124, and a cache operation counter 126. The arithmetic operation counter 122 may count arithmetic operations performed by the arithmetic operation unit 112 of the operation unit 110. Accordingly, the arithmetic operation counter 122 may measure a first operation pattern for the arithmetic operations. Likewise, the memory operation counter 124 may count memory operations performed by the memory operation unit 114 of the operation unit 110, and may measure a second operation pattern for the memory operations. In addition, the cache operation counter 126 may count cache operations performed by the cache operation unit 116 of the operation unit 110 and measure a third operation pattern for the cache operations. However, the present disclosure is not limited thereto, and the operation counter 120 can also measure operation patterns for different types of instructions of the operation unit 110.

The power measurement unit 130 may receive a plurality of operation patterns measured by the operation counter 120. The power measurement unit 130 may calculate the power consumption of the operation unit 110 using a first weight for the first operation pattern measured by the operation counter 120 and a second weight for the second operation pattern measured by the operation counter 120.

In FIG. 5, the first and second operation pattern and the second operation pattern of the operation unit 110 measured by the operation counter 120 are illustrated.

Specifically, referring to 'A' of FIG. 5, the operation unit 110 may have an active section and an idle section. The operation counter 120 may measure the active section and the idle section of the operation unit 110. In addition, the operation counter 120 may measure an operation pattern based upon the type of instructions executed by the operation unit 110 in the active section. For example, the arithmetic operation counter 122 may measure a first operation pattern of the arithmetic operation unit 112 which processes arithmetic operation instructions, and the memory operation counter 124 may measure a second operation pattern of the memory operation unit 114 which processes memory operation instructions.

The power measurement unit 130 may receive data about the first and second operation patterns from the operation counter 120. Different amounts of power may be consumed by the operation unit 110 to process each instruction. Therefore, the power measurement unit 130 may calculate the power consumption using a weight for each operation pattern.

Specifically, the power measurement unit 130 may calculate the power consumption of the operation unit 110 using the first and second operation patterns, weights for the first and second operation patterns, and the average of the power consumption. More specifically, the power measurement unit 130 may calculate the power consumption of the operation unit 110 using Equation (1) below:

$$\text{Power consumption} = ((\text{first operation pattern rate} \times \text{first weight}) + (\text{second operation pattern rate} \times \text{second weight})) \times \text{Power} + a \qquad (1).$$

In Equation (1), the first weight is a weight for the first operation pattern rate, the second weight is a weight for the second operation pattern rate, Power is the average of power consumed by the operation unit 110, and a is a weight for other variables. In some exemplary embodiments of the present disclosure, the first weight may be greater than or equal to the second weight.

For example, if the amount of the power consumption for an arithmetic operation is greater than that of the power consumption for a memory operation, the first weight for the arithmetic operation may be greater than the second weight for the memory operation. In this case, total utilization (that is, the amount of the arithmetic operation and the memory operation) may be equal in A and B in a first period T1. However, the rate of the memory operation may be high in A, and the rate of the arithmetic operation may be high in B. Since a higher weight is given to the arithmetic operation, the power consumption calculated using Equation (1) may be greater in B than in A. However, the present disclosure is not limited thereto.

That is, as in the above example, the power measurement unit 130 may calculate the power consumption of the operation unit 110 by setting a high weight for an operation pattern of the operation unit 110 which requires high power consumption and by setting a low weight for an operation pattern which requires low power consumption. Data about the power consumption calculated by the power measurement unit 130 may be sent to the frequency controller 140.

The frequency controller 140 may adjust an operating frequency used for the first or second operations by using the calculated power consumption. Through a series of the above processes, the operation pattern analyzer 100 of the present disclosure may analyze the operation pattern of the operation unit 110, calculate the power consumption of the operation unit 110 using the analyzed operation pattern, and determine an operating frequency at which the operation unit 100 will operate in a next step. Accordingly, the operating frequency of the operation unit 110 may be changed according to the level of the power consumption. That is, the frequency controller 140 may determine a frequency and voltage, at which the operation unit 110 will operate in a next step, based upon the power consumption. This is called dynamic voltage frequency scaling (DVFS). Here, the frequency controller 140 may control the operating frequency using the power consumption calculated by the power measurement unit 130.

Specifically, when the calculated power consumption is less than threshold power consumption of the operation unit 110, the frequency controller 140 may change the operating frequency to a maximum operating frequency of the operation unit 110. The threshold power consumption may be a limit amount of power supplied to the operation unit 110, or a limit amount of power for preventing the heat generation of the operation unit 110. If the calculated power consumption is less than the threshold power consumption, the operation unit 110 can operate with higher performance. In this case, the frequency controller 140 can increase the performance of the operation unit 110 by changing the operating frequency of the operation unit 110 to the maximum operating frequency.

However, if the operation unit 110 is already operating at the maximum operating frequency and if the calculated power consumption is greater than the threshold power consumption, the frequency controller 140 may change the operating frequency to a frequency less than the maximum operating frequency. This will be described in more detail later.

Figure 6:
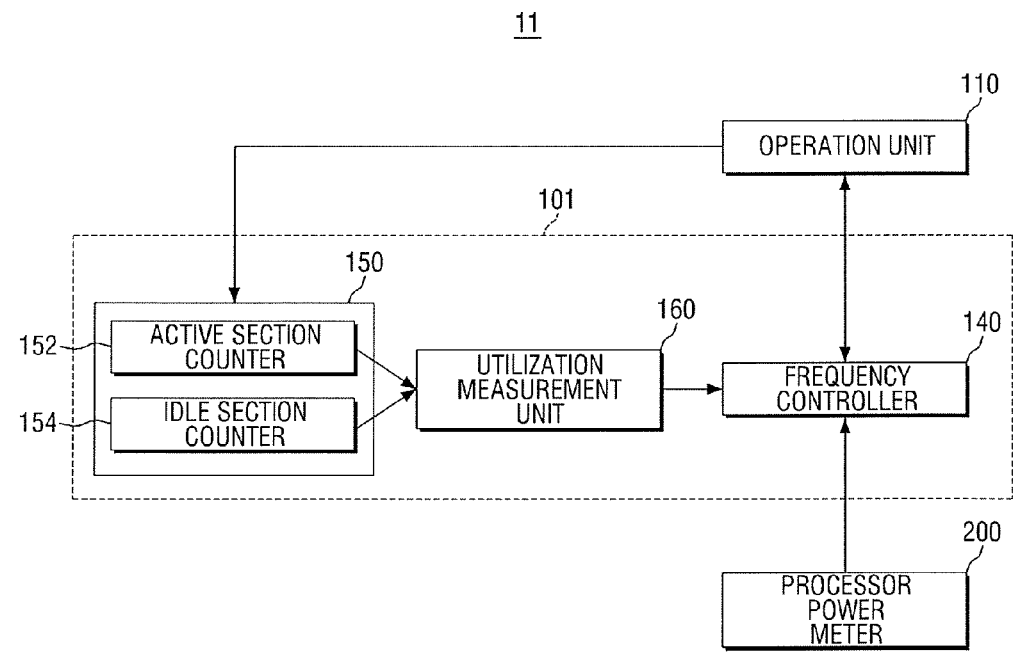
FIG. 6 is a block diagram of a processor according to another exemplary embodiment of the present disclosure.

FIG. 6 is a block diagram of a processor 11 according to another exemplary embodiment of the present disclosure. For simplicity, a description of elements substantially identical to those of the previous exemplary embodiment will be omitted, and the current exemplary embodiment will hereinafter be described, focusing mainly on differences with the pervious exemplary embodiment.

Referring to FIG. 6, the processor 11 according to the current exemplary embodiment may include an operation unit 110, an operation pattern analyzer 101, and a processor power meter 200. The operation unit 110 may operate in substantially the same way as the operation unit 110 of the processor 10 described above with reference to FIG. 3.

The operation pattern analyzer 101 may include a section counter 150, a utilization measurement unit 160, and a frequency controller 140.

The section counter 150 may measure an active section and an idle section of the operation unit 110. The section counter 150 may include an active section counter 152 which measures the active section of the operation unit 110 and an idle section counter 154 which measures the idle section of the operation unit 110.

The utilization measurement unit 160 may calculate an operating rate of the operation unit 110 using a result value of the section counter 150. As illustrated in FIG. 5, the active section and the idle section of the operation unit 110 may alternate. The utilization measurement unit 160 may measure the utilization of the operation unit 110 according to a ratio of the active section to the idle section. The utilization of the operation unit 110 may be represented by an operating rate.

The frequency controller 140 may receive the operating rate of the operation unit 110 from the utilization measurement unit 160, and may adjust the operating frequency of the operation unit 110 using the operating rate. If the operating rate of the operation unit 110 increases, the frequency controller 140 may increase the operating frequency of the operation unit 110. If the operating rate of the operation unit 110 decreases, the frequency controller 140 may decrease the operating frequency of the operation unit 110. The increase or decrease may be adjusted to by a linear rate, by a predetermined rate, or by a specific relational expression, but the present disclosure is not limited thereto.

The processor power meter 200 may measure the actual power consumption of the operation unit 110. The processor power meter 200 may include a voltmeter or an ammeter. The processor power meter 200 may measure direct current (DC) power or alternating current (AC) power using the voltmeter or the ammeter. The actual power consumption measured by the processor power meter 200 may be sent to the frequency controller 140. The processor power meter 200 may be located inside or outside the processor 11, but the present disclosure is not limited thereto.

When the measured power consumption is less than threshold power consumption of the operation unit 110, the frequency controller 140 may change the operating frequency of the operation unit 110 to a maximum operating frequency of the operation unit 110. If the measured power consumption is less than the threshold power consumption, the operation unit 110 can operate with higher performance. In this case, the frequency controller 140 can increase the performance of the operation unit 110 by changing the operating frequency of the operation unit 110 to the maximum operating frequency.

However, if the operation unit 110 is already operating at the maximum operating frequency and if the measured power consumption is greater than the threshold power consumption, the frequency controller 140 may change the operating frequency to a frequency less than the maximum operating frequency. If the power consumption of the operation unit 110 continues to be greater than the threshold power consumption, the operation unit 110 can be overloaded, thereby degrading the performance of the operation unit 110. In this case, the frequency controller 140 may reduce the load of the operation unit 110 by lowering the operating frequency.

That is, while the processor 10 described above with reference to FIG. 3 uses power consumption calculated by the operation pattern analyzer 101, the processor 11 of FIG. 6 may use power consumption measured by the processor power meter 200.

Figure 7:
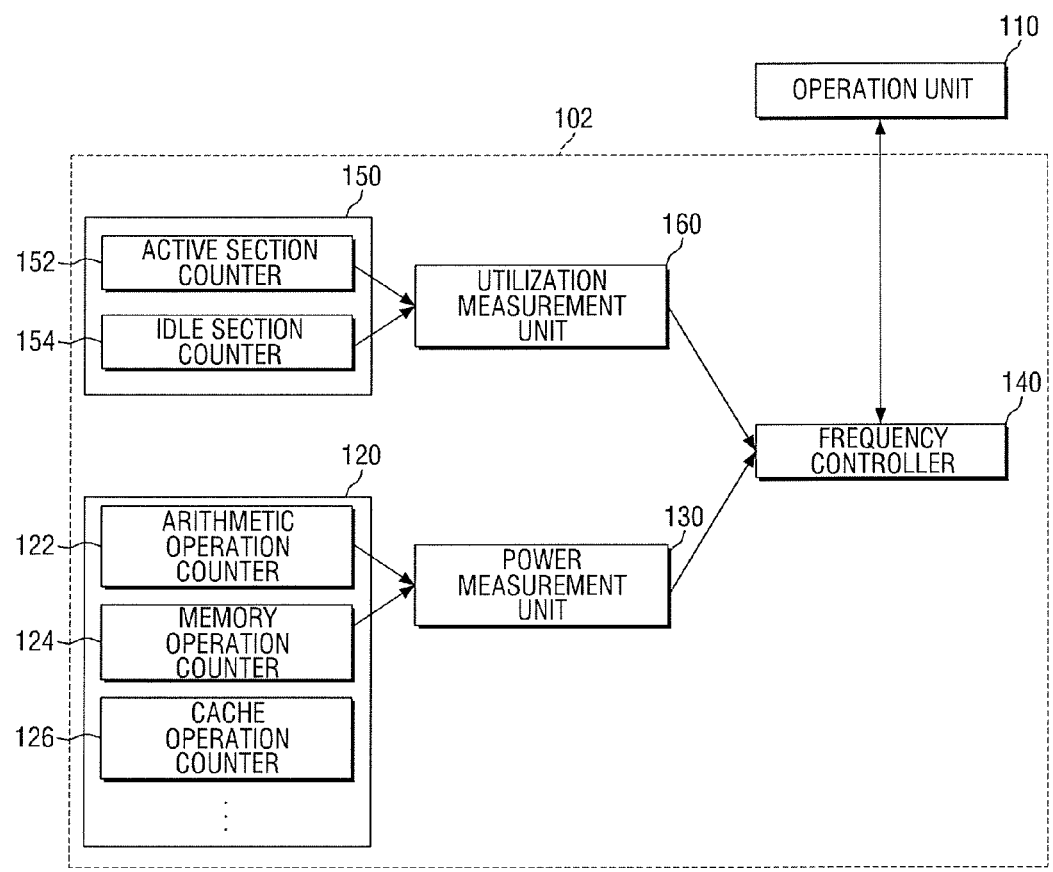
FIG. 7 is a block diagram of a processor according to another exemplary embodiment of the present disclosure.

FIG. 7 is a block diagram of a processor 12 according to another exemplary embodiment of the present disclosure. For simplicity, a description of elements substantially identical to those of the previous exemplary embodiments will be omitted, and the current exemplary embodiment will hereinafter be described, focusing mainly on differences with the pervious exemplary embodiments.

Referring to FIG. 7, the processor 12 according to the current exemplary embodiment may include an operation unit 110 and an operation pattern analyzer 102.

The operation pattern analyzer 102 may include a section counter 150, a utilization measurement unit 160, an operation counter 120, a power measurement unit 130, and a frequency controller 140. The section counter 150 and the utilization measurement unit 160 may operate in substantially the same way as the section counter 150 and the utilization measurement unit 160 of the processor 11 described above with reference to FIG. 6. That is, the utilization measurement unit 160 may calculate an operating rate of the operation unit 110 using a result value of the section counter 150, and may send the operating rate to the frequency controller 140.

The operation counter 120 and the power measurement unit 130 may operate in substantially the same way as the operation counter 120 and the power measurement unit 130 of the processor 10 described above with reference to FIG. 3. The power consumption of the operation unit 110 calculated by the power measurement unit 130 may be sent to the frequency controller 140.

The frequency controller 140 may adjust an operating frequency using the operating rate and power consumption of the operation unit 110. Here, the frequency controller 140 may set the operating frequency to any one of first through $N^{th}$ frequencies, where N is a natural number. For example, the $N^{th}$ frequency may be a maximum operating frequency, and an $(N-1)^{th}$ frequency which is less than the $N^{th}$ frequency may be a reference frequency. More specifically, the operating frequency of the operation unit 110 may be set to a predetermined level such as 160 MHz, 260 MHz, 350

MHz, 450 MHz or 550 MHz. Here, 550 MHz may be the maximum operating frequency, and 450 MHz lower than 550 MHz may be the reference frequency. However, the present disclosure is not limited thereto, and the first through $N^{th}$ frequencies may be changed by a value preset by a user.

When the operating rate of the operation unit 110 increases, the frequency controller 140 may increase the operating frequency within a range in which the operating frequency is less than the reference frequency. Likewise, when the operating rate of the operation unit 110 decreases, the frequency controller 140 may decrease the operating frequency. That is, the frequency controller 140 can adjust the operating frequency by using only the operating rate within a range in which the operating frequency is less than the reference frequency of the operation unit 110. Therefore, the operation counter 120 and the power measurement unit 130 may not operate. However, the present disclosure is not limited thereto.

On the contrary, the operation counter 120 and the power measurement unit 130 may operate within a range in which the operating frequency of the operation unit 110 is greater than or equal to the reference frequency. When calculated power consumption is less than threshold power consumption of the operation unit 110, the frequency controller 140 may change the operating frequency to the maximum operating frequency. For example, the frequency controller 140 may change the $(N-1)^{th}$ frequency to the $N^{th}$ frequency. That is, the frequency controller 140 can adjust the operating frequency using only the power consumption within the range in which the operating frequency is greater than or equal to the reference frequency of the operation unit 110, but the present disclosure is not limited thereto.

However, if the operation unit 110 is already operating at the maximum operating frequency and if the calculated power consumption is greater than the threshold power consumption, the frequency controller 140 may change the operating frequency to a frequency less than the maximum operating frequency. If the power consumption of the operation unit 110 continues to be greater than the threshold power consumption, the operation unit 110 can be overloaded, thereby degrading the performance of the operation unit 110. In this case, the frequency controller 140 may reduce the load of the operation unit 110 by lowering the operating frequency.

Figure 8:
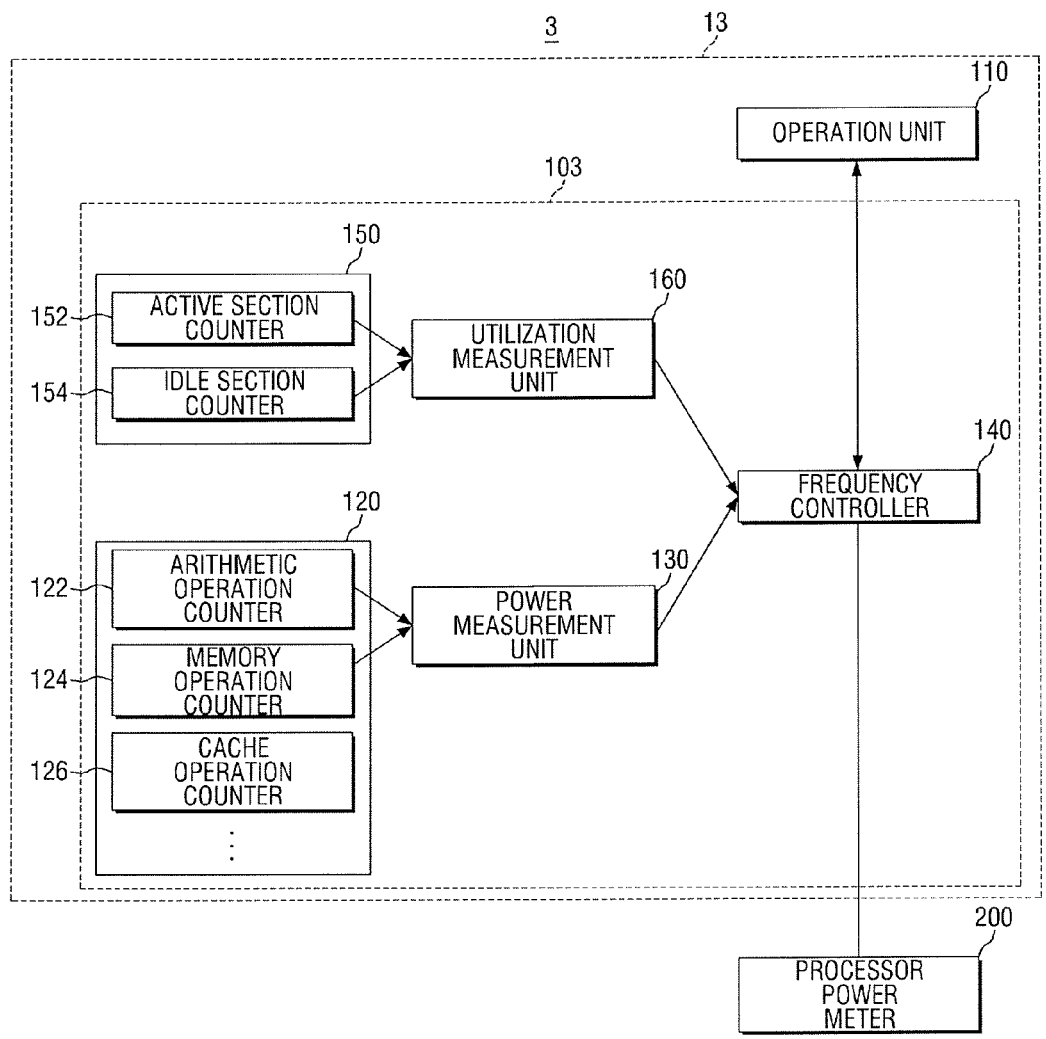
FIG. 8 is a block diagram of a semiconductor device according to another exemplary embodiment of the present disclosure.

FIG. 8 is a block diagram of a semiconductor device according to another exemplary embodiment of the present disclosure. For simplicity, a description of elements substantially identical to those of the previous exemplary embodiments will be omitted, and the current exemplary embodiment will hereinafter be described, focusing mainly on differences with the pervious exemplary embodiments.

Referring to FIG. 8, the semiconductor device according to the current exemplary embodiment may include a processor 13 and a processor power meter 200. The processor 13 may include an operation unit 110 and an operation pattern analyzer 103.

The processor 13 may operate in substantially the same way as the processor 12 described above with reference to FIG. 7.

The processor power meter 200 may measure the actual power consumption of the operation unit 110 within the processor 13. The power consumption measured by the processor power meter 200 may be sent to a frequency controller 140. The processor power meter 200 may be located outside the processor 13, but the present disclosure is not limited thereto.

When the power consumption measured by the processor power meter 200 and the power consumption calculated by a power measurement unit 130 are less than threshold power consumption of the operation unit 110, the frequency controller 140 may change an operating frequency of the operation unit 110 to a maximum operating frequency.

However, if the operation unit 110 is already operating at the maximum operating frequency and if the measured power consumption or the calculated power consumption is greater than the threshold power consumption, the frequency controller 140 may change the operating frequency to a frequency less than the maximum operating frequency. If the power consumption of the operation unit 110 continues to be greater than the threshold power consumption, the operation unit 110 can be overloaded, thereby degrading the performance of the operation unit 110. Therefore, when any one of the measured power consumption and the calculated power consumption is greater than the threshold power consumption, the frequency controller 140 may reduce the load of the operation unit 110 by lowering the operating frequency.

Figure 9:
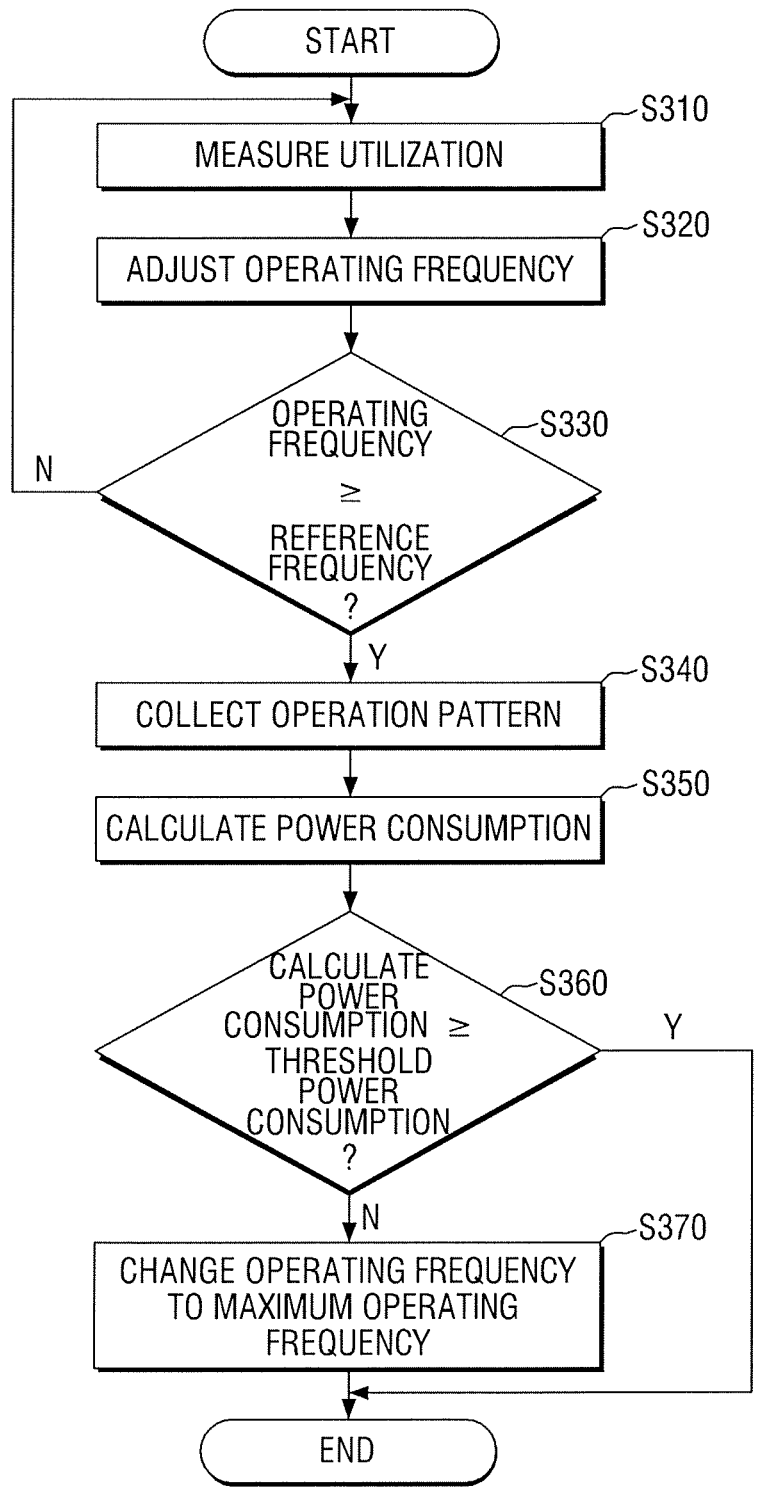
FIG. 9 is a flowchart illustrating the operation of a semiconductor device according to an exemplary embodiment of the present disclosure.
Figure 10:
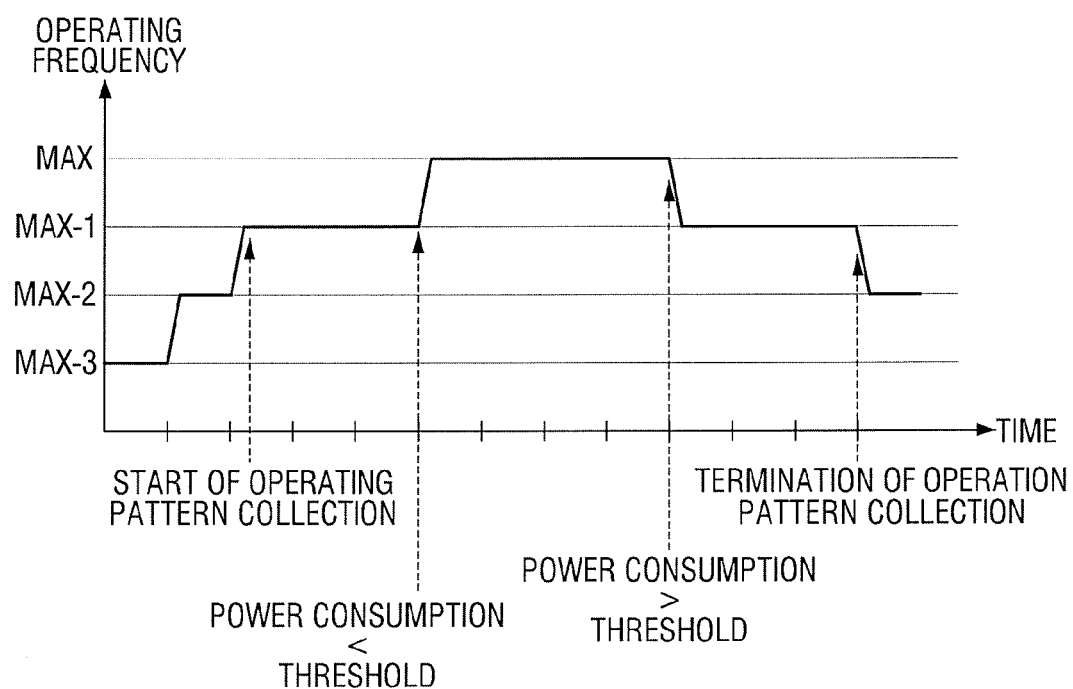
FIG. 10 is a graph illustrating the operation of the semiconductor device according to the exemplary embodiment of the present disclosure.

FIG. 9 is a flowchart illustrating the operation of a semiconductor device according to an exemplary embodiment of the present disclosure. FIG. 10 is a graph illustrating the operation of the semiconductor device according to the exemplary embodiment of the present disclosure.

Referring to FIG. 9, the semiconductor device according to the current exemplary embodiment of the present disclosure may measure utilization of an operation unit 110 (operation S310). The utilization of the operation unit 110 may be measured by measuring an active section and an idle section of the operation unit 110 and by calculating an operating rate of the operation unit 110 using the measured data.

A frequency controller 140 may adjust an operating frequency of the operation unit 110 using the calculated operating rate (operation S320). When the operating rate of the operation unit 110 increases, the frequency controller 140 may increase the operating frequency of the operation unit 110. When the operating rate of the operation unit 110 decreases, the frequency controller 140 may decrease the operating frequency of the operation unit 110. The operating frequency of the operation unit 110 of a processor 10 may be set to any one of first through $N^{th}$ frequencies, where N is a natural number. For example, the $N^{th}$ frequency may be a maximum operating frequency, and an $(N-1)^{th}$ frequency less than the $N^{th}$ frequency may be a reference frequency. The first through $N^{th}$ frequencies may be changed by a value preset by a user.

Specifically, referring to FIG. 10, the x axis represents time slots of equal length for determining DVFS level, and the y axis represents operating frequency. There may be first through fourth frequencies MAX-3, MAX-2, MAX-1 and MAX. In a range equal to or lower than the third frequency MAX-1, the operating frequency may be set to one of the first through third frequencies MAX-3, MAX-2 and MAX-1 according to the operating rate. Here, the third frequency MAX-1 is the reference frequency. For example, the operating frequency may be set to a predetermined level such as 260 MHz, 350 MHz, 450 MHz or 550 MHz, but the present disclosure is not limited thereto.

Referring back to FIG. 9, it is determined whether the operating frequency of the operation unit 110 is greater than or equal to the reference frequency (operation S330). When the operating frequency is less than the reference frequency, the frequency controller 140 may repeat operations S310 and S320. That is, when the operating frequency is less than the reference frequency, it can be adjusted in view of the operating rate only.

On the other hand, when the operating frequency is greater than or equal to the reference frequency, an operation pattern analyzer 100 may collect an operation pattern of the operation unit 110 (operation S340). Specifically, an operation counter 120 of the operation pattern analyzer 100 may measure a first operation pattern by counting first operations of the operation unit 110, and may measure a second operation pattern by counting second operations of the operation unit 110 which are different from the first operations.

A power measurement unit 130 may calculate power consumption of the operation unit 110 by using a first weight for the first operation pattern and a second weight for the second operation pattern (operation S350). The calculated power consumption may be sent to the frequency controller 140.

The frequency controller 140 may determine whether the calculated power consumption is greater than or equal to threshold power consumption (operation S360). Specifically, referring to FIG. 10, when the operating frequency is the third frequency MAX-1, the operation pattern analyzer 100 may calculate the power consumption, and may determine whether the calculated power consumption is greater than the threshold power consumption.

When the calculated power consumption is less than the threshold power consumption, the frequency controller 140 may set the operating frequency to a maximum operating frequency (operation S370). If the calculated power consumption is less than the threshold power consumption, the operation unit 110 can operate with higher performance. In this case, the frequency controller 140 can increase the performance of the operation unit 110 by changing the operating frequency of the operation unit 110 to the maximum operating frequency.

On the other hand, when the calculated power consumption is greater than or equal to the threshold power consumption, the frequency controller 140 may not adjust the operating frequency of the operation unit 110 because the operation unit 110 is already operating with full load.

Figure 11:
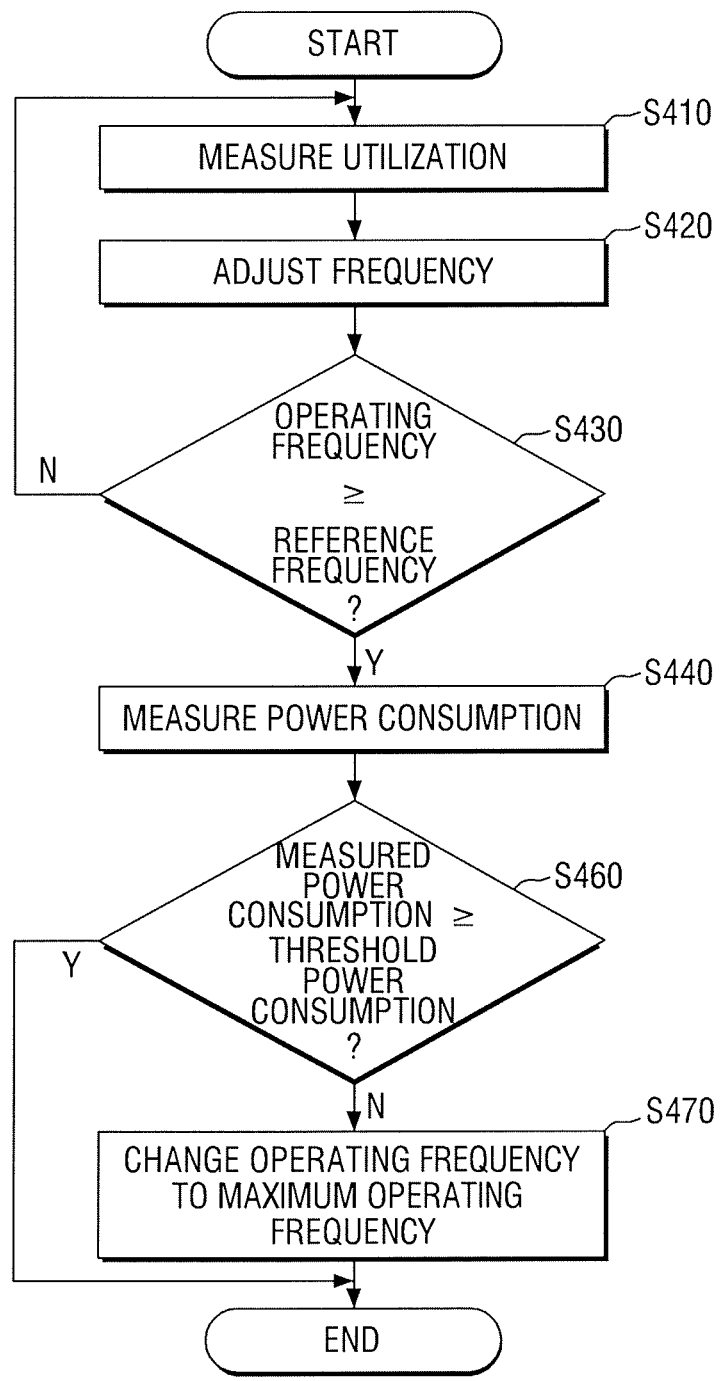
FIG. 11 is a flowchart illustrating the operation of a semiconductor device according to another exemplary embodiment of the present disclosure.

FIG. 11 is a flowchart illustrating the operation of a semiconductor device according to another exemplary embodiment of the present disclosure. For simplicity, a description of elements substantially identical to those of the previous exemplary embodiment will be omitted, and the current exemplary embodiment will hereinafter be described, focusing mainly on differences with the pervious exemplary embodiment.

Referring to FIG. 11, operations S410 through S430 of the semiconductor device according to the current exemplary embodiment are substantially the same as operations S310 through S330 described above with reference to FIG. 9. That is, in a range equal to or lower than a reference frequency, an operating frequency may be adjusted based only upon utilization of an operation unit 110 of a processor 10.

A processor power meter 200 may actually measure power consumption of the processor 10 (operation S440). The processor power meter 200 may measure actual power consumption of the operation unit 110. The processor power meter 200 may include a voltmeter or an ammeter. The processor power meter 200 may measure DC power or AC power of the operation unit 110 using the voltmeter or the ammeter. The actual power consumption measured by the processor power meter 200 may be sent to a frequency controller 140.

Then, the frequency controller 140 may determine whether the measured power consumption is greater than or equal to threshold power consumption (operation S460).

When the measured power consumption is less than threshold power consumption, the frequency controller 140 may set the operating frequency to a maximum operating frequency (operation S470). If the measured power consumption is less than the threshold power consumption, the operation unit 110 can operate with higher performance. In this case, the frequency controller 140 can increase the performance of the operation unit 110 by changing the operating frequency of the operation unit 110 to the maximum operating frequency.

On the other hand, when the measured power consumption is greater than or equal to the threshold power consumption, the frequency controller 140 may not adjust the operating frequency.

Figure 12:
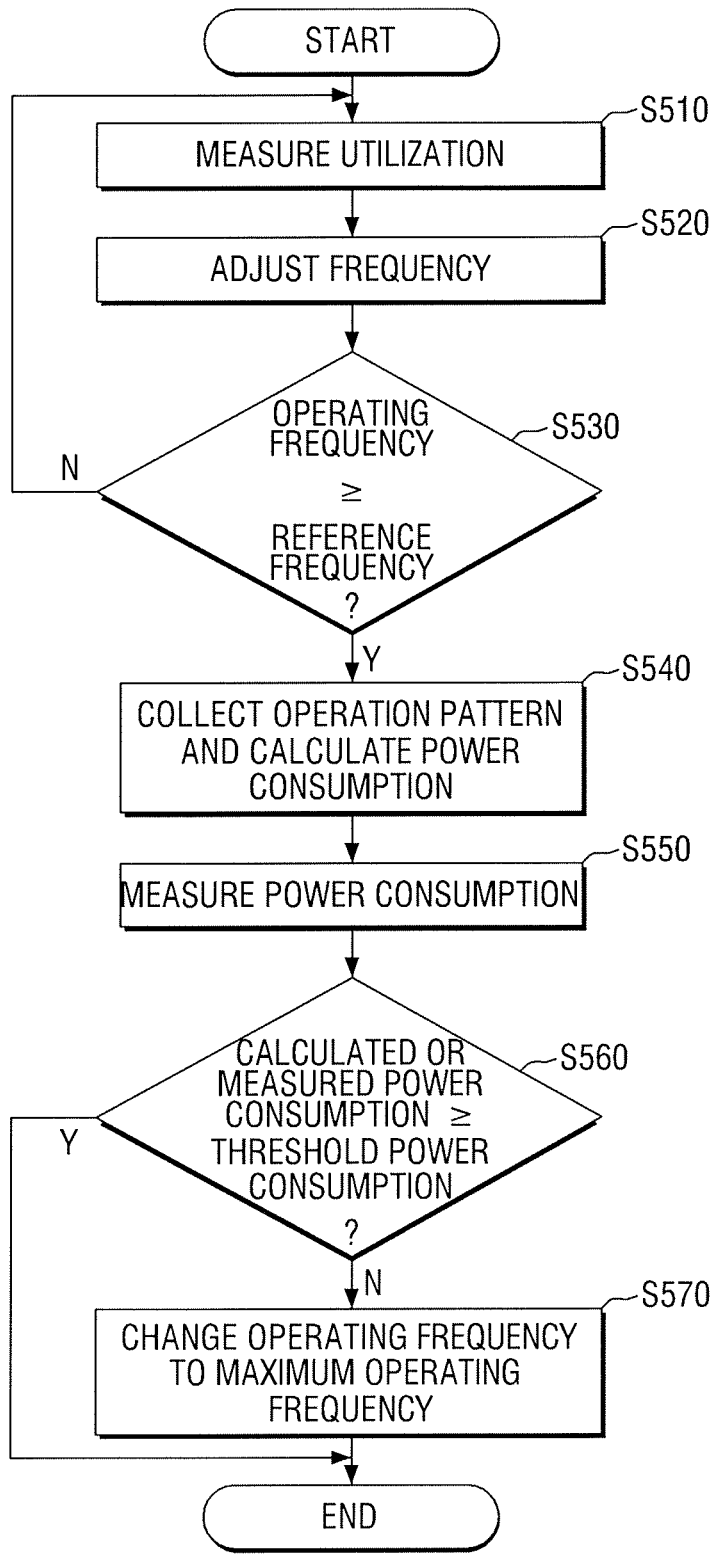
FIG. 12 is a flowchart illustrating the operation of a semiconductor device according to another exemplary embodiment of the present disclosure.

FIG. 12 is a flowchart illustrating the operation of a semiconductor device according to another exemplary embodiment of the present disclosure. For simplicity, a description of elements substantially identical to those of the previous exemplary embodiments will be omitted, and the current exemplary embodiment will hereinafter be described, focusing mainly on differences with the pervious exemplary embodiments.

Referring to FIG. 12, operations S510 through S540 of the semiconductor device according to the current exemplary embodiment are substantially the same as operations S310 through S350 described above with reference to FIG. 9. That is, in a range equal to or lower than a reference frequency, an operating frequency may be adjusted based only upon utilization of an operation unit 110 of a processor 10. In a range of higher than the reference frequency, power consumption of the operation unit 110 of the processor 10 may be calculated using an operation pattern in order to adjust the operating frequency based upon the power consumption of the operation unit 110 as well.

A processor power meter 200 may actually measure the power consumption of the processor 10 (operation S550). The measured power consumption may be sent to a frequency controller 140. Therefore, the frequency controller 140 may receive first power consumption calculated by an operation pattern analyzer 100 and power consumption measured by the processor power meter 200.

The frequency controller 140 may determine whether the measured power consumption or the calculated power consumption is greater than or equal to threshold power consumption (operation S560).

When the measured power consumption or the calculated power consumption (that is, the first or second power consumption) is less than threshold power consumption of the operation unit 110, the frequency controller 140 may change the operating frequency to a maximum operating frequency of the operation unit 110 (operation S570). If the measured power consumption or the calculated power consumption is less than the threshold power consumption, the operation unit 110 can operate with higher performance. In this case, the frequency controller 140 can increase the performance of the operation unit 110 by changing the operating frequency of the operation unit 110 to the maximum operating frequency.

On the other hand, when the measured power consumption or the calculated power consumption is greater than or equal to the threshold power consumption, the operating frequency of the operation unit 110 may not be adjusted.

In FIG. 12, operations S540 and S550 may be performed sequentially. However, the present disclosure is not limited thereto. That is, operations S540 and S550 can be performed in a different order or simultaneously.

Figure 13:
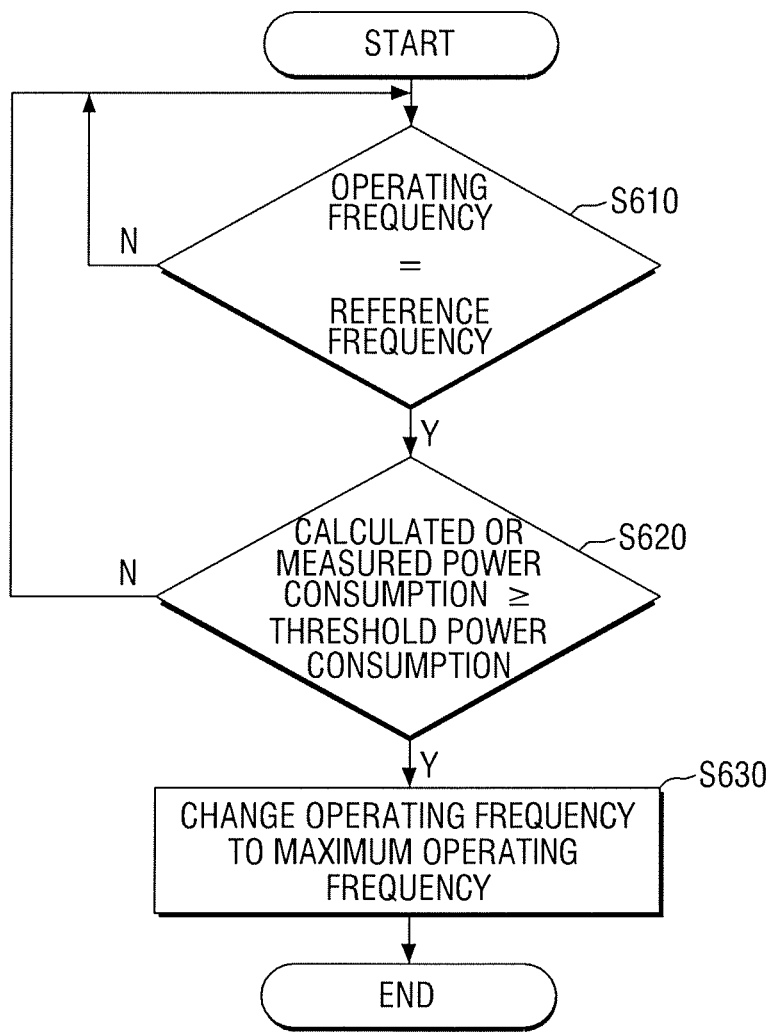
FIG. 13 is a flowchart illustrating the operation of a semiconductor device according to exemplary embodiments of the present disclosure.

FIG. 13 is a flowchart illustrating the operation of a semiconductor device according to exemplary embodiments of the present disclosure. For simplicity, a description of elements substantially identical to those of the previous exemplary embodiments will be omitted, and the current exemplary embodiment will hereinafter be described, focusing mainly on differences with the pervious exemplary embodiments.

Referring to FIGS. 10 and 13, a frequency controller 140 may determine whether an operating frequency is equal to a maximum operating frequency (operation S610).

When the operating frequency is equal to the maximum operating frequency, it is determined whether power consumption calculated by an operation pattern analyzer 100 or power consumption measured by a processor power meter 200 is greater than threshold power consumption (operation S620).

When the calculated power consumption or the measured power consumption is greater than or equal to the threshold power consumption, the operation frequency may be changed to a reference frequency less than the maximum operating frequency (operation S630). For example, referring to FIG. 10, if a current operating frequency is the fourth frequency MAX and if the calculated or measured power consumption is greater than the threshold power consumption, the frequency controller 140 may change the operating frequency to the third frequency MAX-1. When the operation unit 110 is operating with too much load, it is necessary to reduce the load of the operation unit 110 or to minimize the heat generation of the operation unit 110 by lowering the operating frequency so that an operation unit 110 can operate normally.

On the other hand, when the operating frequency is less than the maximum operating frequency and when the calculated power consumption or the measured power consumption is less than the threshold power consumption, operation S610 may be repeated.

Figure 14:
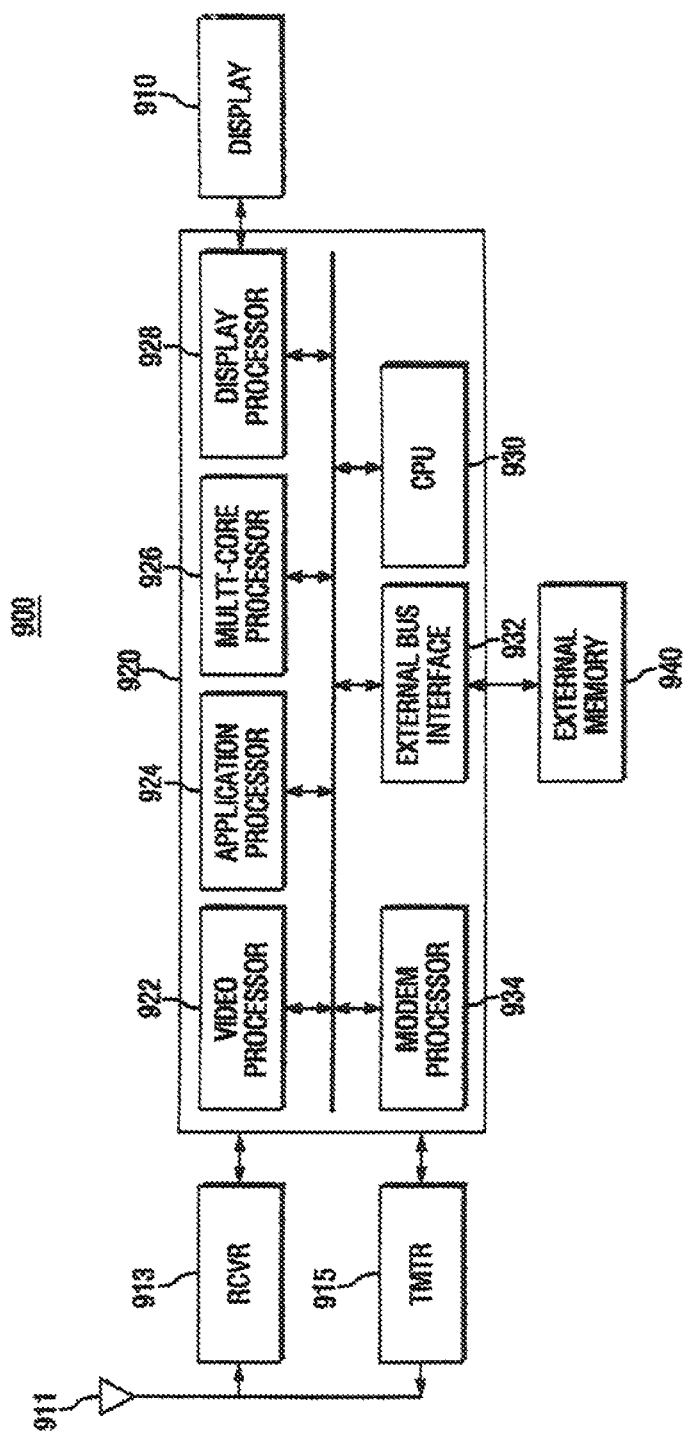
FIG. 14 is a block diagram of a wireless communication device including semiconductor devices according to exemplary embodiments of the present disclosure.

FIG. 14 is a block diagram of a wireless communication device 900 including semiconductor devices according to exemplary embodiments of the present disclosure.

Referring to FIG. 14, the wireless communication device 900 may be a cellular phone, a smartphone terminal, a handset, a personal digital assistant (PDA), a laptop computer, a video game unit or some other device. The device 900 may use Code Division Multiple Access (CDMA), Time Division Multiple Access (TDMA), such as Global System for Mobile communications (GSM), or some other wireless communication standard.

The device 900 may provide bidirectional communication via a reception path and a transmission path. On the reception path, signals transmitted by one or more base stations may be received by an antenna 911 and provided to a receiver (RCVR) 913. The RCVR 913 may condition and digitize the received signal, and may provide samples to a digital section 120 for further processing. On the transmission path, a transmitter (TMTR) 915 may receive data transmitted from the digital section 920, process and condition the data, generate a modulated signal, and transmit the modulated signal to one or more base stations via the antenna 911.

The digital section 920 may be implemented as one or more digital signal processors (DSPs), microprocessors, reduced instruction set computers (RISCs), and the like. In addition, the digital section 920 may be fabricated on one or more application specific integrated circuits (ASICs) or some other type of integrated circuits (ICs).

The digital section 920 may include various processing and interface units such as, for example, a modem processor 934, a video processor 922, an application processor 924, a display processor 928, a controller/multi-core processor 926, a CPU 930, and an external bus interface (EBI) 932.

The video processor 922 may perform processing for graphics applications. Generally, the video processor 922 may include any number of processing units or modules for any set of graphics operations. Certain portions of the video processor 922 may be implemented as firmware and/or software. For example, a control unit may be implemented as firmware and/or software modules (e.g., procedures, functions, and the like) that perform functions described herein. The firmware and/or software codes may be stored in a memory and executed by a processor (e.g., the multi-core processor 926). The memory may be implemented inside or outside the processor.

The video processor 922 may implement a software interface such as Open Graphics Library (OpenGL), Direct3D, and the like. The CPU 930 may execute a series of graphics processing operations, together with the video processor 922. The controller/multi-core processor 926 may include two or more cores. The controller/multi-core processor 926 may allocate to two cores a workload that is to be processed according to the workload, and may process the workload simultaneously.

In FIG. 14, the application processor 924 is illustrated as an element of the digital section 920. However, the present disclosure is not limited thereto. In some exemplary embodiments of the present disclosure, the digital section 920 may be integrated into one application processor 924 or one application chip.

The modem processor 934 may perform operations needed to deliver data between each of the RCVR 913 and the TMTR 915 and the digital section 920. The display processor 928 may perform operations needed to drive a display 910.

The semiconductor devices 1 through 3 according to the above-described exemplary embodiments of the present disclosure may be used as a cache memory or a buffer memory utilized for the operations of the processors 922, 924, 926, 928, 930 and 934.

A computing system including semiconductor devices according to exemplary embodiments of the present disclosure will now be described with reference to FIG. 15.

Figure 15:
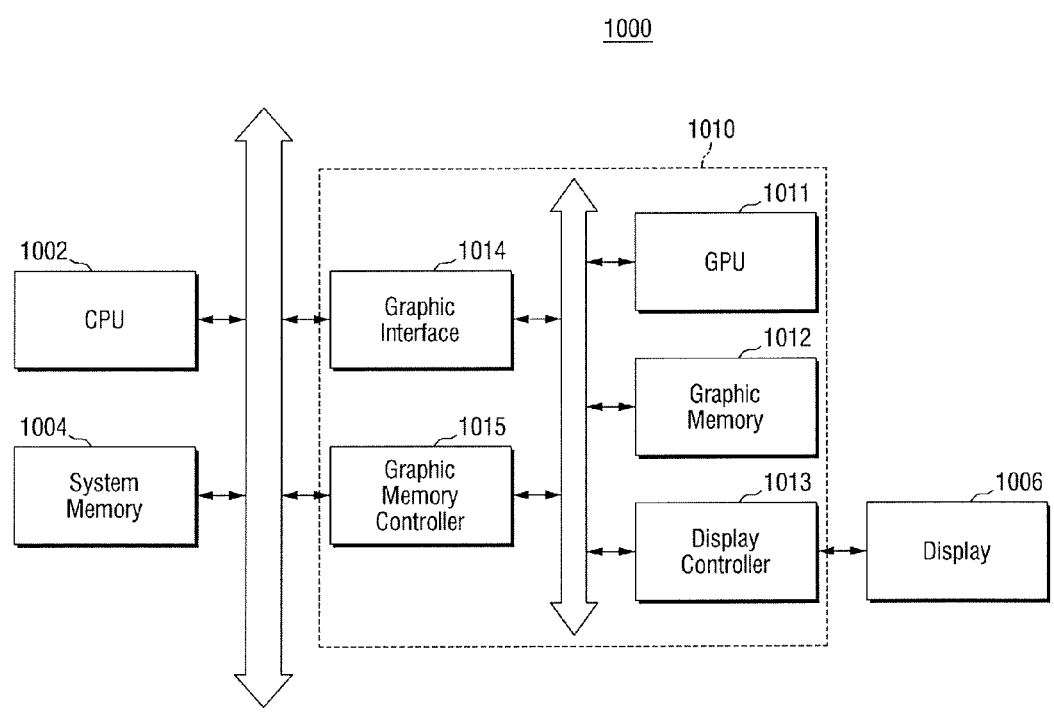
FIG. 15 a block diagram of a system on chip (SoC) system including semiconductor devices according to exemplary embodiments of the present disclosure.

FIG. 15 a block diagram of a computing system 1000 including semiconductor devices according to exemplary embodiments of the present disclosure.

Referring to FIG. 15, the computing system 1000 according to an exemplary embodiment of the present disclosure may include a CPU 1002, a system memory 1004, a graphic system 1010, and a display 1006.

The CPU 1002 may perform operations needed to drive the computing system 1000. The system memory 1004 may be configured to store data. The system memory 1004 may store data processed by the CPU 1002. The system memory 1004 may function as a working memory of the CPU 1002. The system memory 1004 may include one or more volatile memories such as a DDR SDRAM or an SDR SDRAM and/or one or more nonvolatile memories such as an EEPROM or a flash memory. Any one of the semiconductor devices 1 through 3 according to the above-described exemplary embodiments may be employed as an element of the system memory 1004.

The graphic system 1010 may include a GPU 1011, a graphic memory 1012, a display controller 1013, a graphic interface 1014, and a graphic memory controller 1015.

The GPU 1011 may perform graphic operations needed for the computing system 1000. Specifically, the GPU 1011 may assemble primitives, each composed of one or more vertices, and may perform rendering using the assembled primitives.

The graphic memory 1012 may store graphic data processed by the GPU 1011 or graphic data provided to the GPU 1011. In addition, the graphic memory 1012 may function as a working memory of the GPU 1011. Any one of the semiconductor devices 1 through 3 according to the above-described exemplary embodiments may be employed as an element of the graphic memory 1012.

The display controller 1013 may control the display 1006 to display a rendered image frame.

The graphic interface 1014 may perform interfacing between the CPU 1002 and the GPU 1011, and the graphic memory controller 1015 may provide memory accessing between the system memory 1004 and the GPU 1011.

Although not illustrated in FIG. 15, the computing system 1000 may further include one or more input devices such as buttons, a touch screen, or a microphone, and/or one or more output devices such as a speaker. In addition, the computing system 1000 may further include an interface for exchanging data with an external device in a wired or wireless manner. For example, the interface may be an antenna or a wired/wireless transceiver.

Depending on exemplary embodiments, the computing system 1000 may be any computing system such as a mobile phone, a smartphone, a PDA, a desktop computer, a notebook computer, a tablet computer, or the like.

An electronic system including semiconductor devices according to exemplary embodiments of the present disclosure will now be described with reference to FIG. 16.

Figure 16:
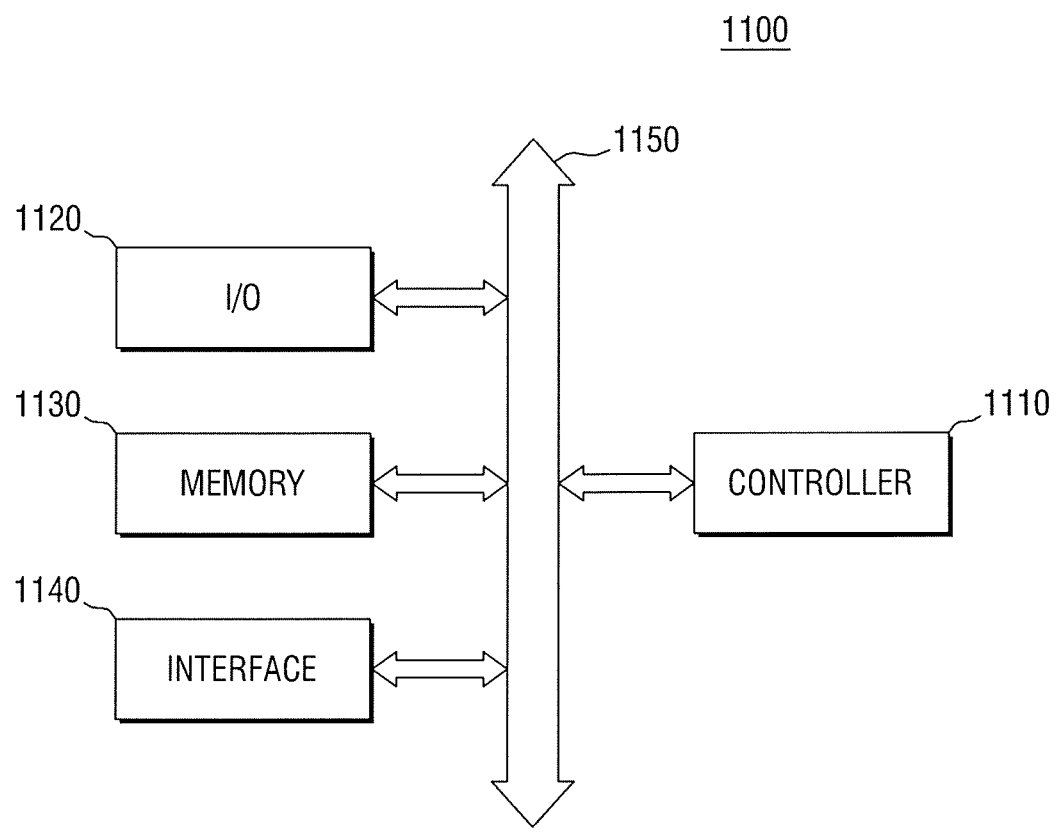
FIG. 16 is a block diagram of an electronic system including semiconductor devices according to exemplary embodiments of the present disclosure.

FIG. 16 is a block diagram of an electronic system 1100 including semiconductor devices according to exemplary embodiments of the present disclosure.

Referring to FIG. 16, the electronic system 1100 according to an exemplary embodiment of the present disclosure may include a controller 1110, an input/output (I/O) device 1120, a memory device 1130, an interface 1140 and a bus 1150. The controller 1110, the I/O device 1120, the memory device 1130 and/or the interface 1140 may be connected to one another by the bus 1150. The bus 1150 may serve as a path for transmitting data.

The controller 1110 may include at least one of a microprocessor, a digital signal processor, a microcontroller and logic devices capable of performing similar functions to those of a microprocessor, a digital signal processor and a microcontroller.

The I/O device 1120 may include a keypad, a keyboard and a display device. The memory device 1130 may store data and/or commands. The interface 1140 may be used to transmit data to or receive data from a communication network. The interface 1140 may be a wired or wireless interface. In an example, the interface 1140 may include an antenna or a wired or wireless transceiver.

Although not illustrated in the drawing, the electronic system 1100 may be a working memory for improving the operation of the controller 1110, and may also include a high-speed dynamic random access memory (DRAM) or static random access memory (SRAM). Here, any one of the semiconductor devices 1 through 3 according to the above-described exemplary embodiments of the present disclosure may be employed as the working memory. In addition, any one of the semiconductor devices 1 through 3 according to the above-described exemplary embodiments may be provided in the memory device 1130 or in the controller 1110 or the I/O device 1120.

The electronic system 1100 may be applied to a PDA, a portable computer, a web tablet, a wireless phone, a mobile phone, a digital music player, a memory card, or nearly all types of electronic products capable of transmitting and/or receiving information in a wireless environment.

Figure 17:
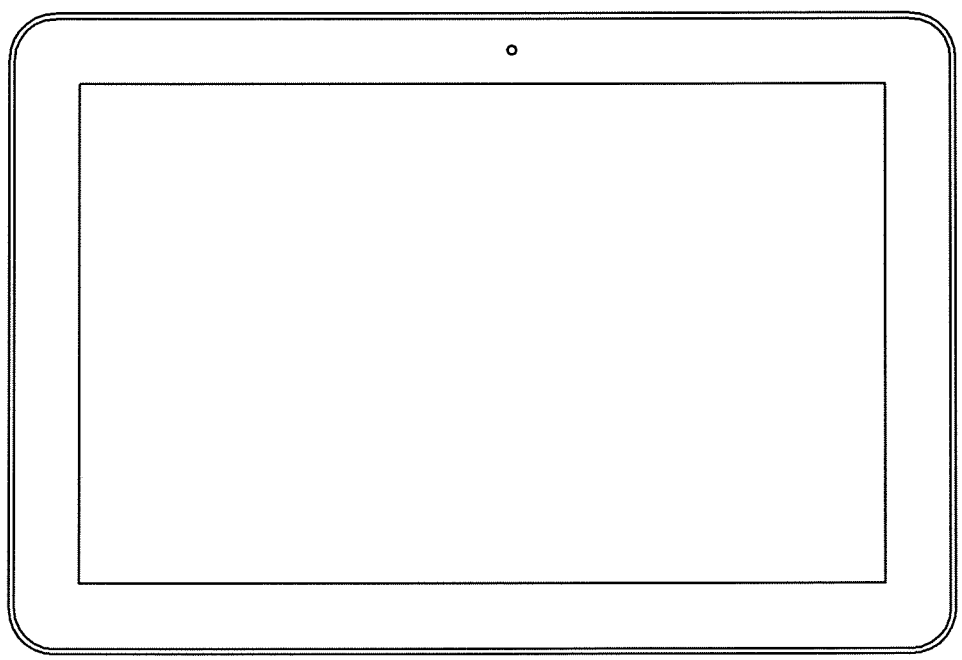
FIGS. 17 through 19 illustrate examples of a semiconductor system to which semiconductor devices according to exemplary embodiments of the present disclosure can be applied.
Figure 18:
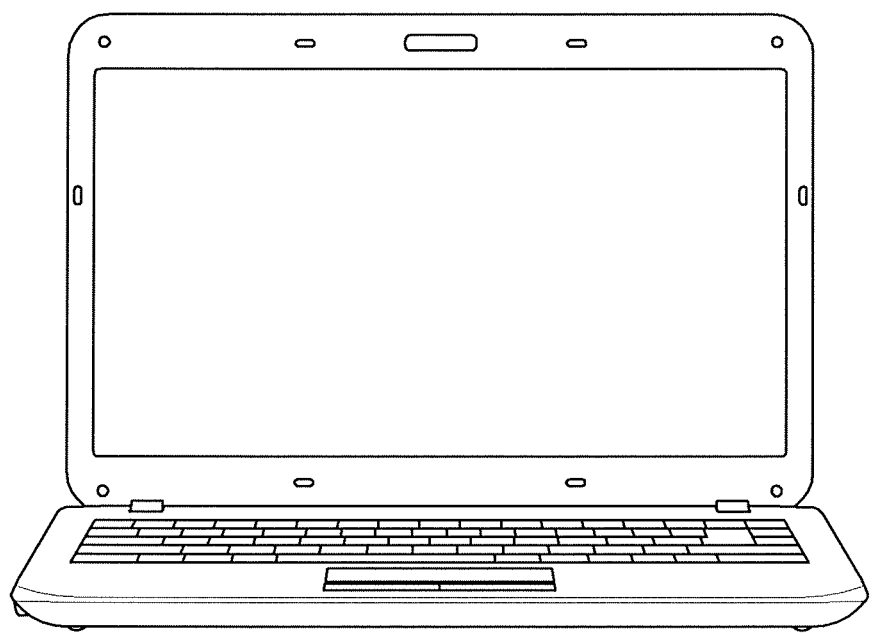
Figure 19:
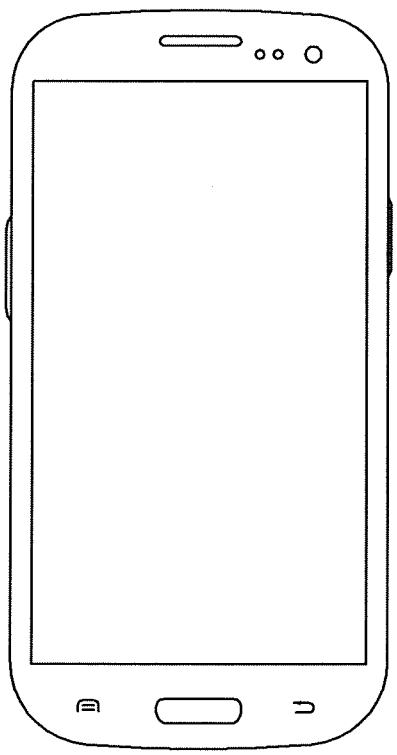

FIGS. 17 through 19 illustrate examples of a semiconductor system to which semiconductor devices according to exemplary embodiments of the present disclosure can be applied.

FIG. 17 illustrates a tablet personal computer (PC) 1200, FIG. 18 illustrates a notebook computer 1300, and FIG. 19 illustrates a smartphone 1400. At least one of the semiconductor devices 1 through 3 according to the above-described exemplary embodiments of the present disclosure, as set forth herein, may be used in the tablet PC 1200, the notebook computer 1300, and the smartphone 1400.

Semiconductor devices according to exemplary embodiments of the present disclosure, as set forth herein, may also be applied to various IC devices other than those set forth herein. That is, while the tablet PC 1200, the notebook computer 1300, and the smartphone 1400 have been described above as examples of the semiconductor system according to the current exemplary embodiment of the present disclosure, the examples of the semiconductor system according to the current exemplary embodiment are not limited to the tablet PC 1200, the notebook computer 1300, and the smartphone 1400. In some exemplary embodiments of the present disclosure, the semiconductor system may be provided as a computer, an Ultra Mobile PC (UMPC), a work station, a net-book computer, a PDA, a portable computer, a wireless phone, a mobile phone, an e-book, a portable multimedia player (PMP), a portable game console, a navigation device, a black box, a digital camera, a 3-dimensional television set, a digital audio recorder, a digital audio player, a digital picture recorder, a digital picture player, a digital video recorder, a digital video player, and the like.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. It is therefore desired that the present exemplary embodiments be considered in all respects as illustrative and not restrictive, reference being made to the appended claims rather than the foregoing description to indicate the scope of the present disclosure.

What is claimed is:

1. A processor comprising:

an operation unit;

an operation counter configured to measure a first rate at which a first operation is executed by counting executions of the first operation by the operation unit during a time period and to measure a second rate at which a second operation is executed by counting executions of the second operation by the operation unit during the time period, wherein the second operation is different from the first operation;

a power measurement unit configured to calculate power consumption of the operation unit using a first weight for the first operation and the first rate, and a second weight for the second operation and the second rate; and a frequency controller configured to adjust an operating frequency of the operation unit using the calculated power consumption.

2. The processor of claim 1, further comprising:

a section counter configured to measure an active section and an idle section of the operation unit; and a utilization measurement unit configured to calculate an operating rate of the operation unit using a result value of the section counter, wherein the frequency controller is configured to adjust the operating frequency using the operating rate.

3. The processor of claim 2, wherein the frequency controller is configured to increase the operating frequency when the operating rate of the operation unit increases, and the frequency controller is configured to decrease the operating frequency when the operating rate of the operation unit decreases.

4. The processor of claim 1, wherein the power measurement unit is configured to operate when the operating frequency is greater than or equal to a reference frequency of the operation unit, the reference frequency being set to a frequency that is less than a maximum operating frequency of the operation unit.

5. The processor of claim 4, wherein the frequency controller is configured to set the operating frequency to one of first through N-th frequencies, the maximum operating frequency being the N-th frequency, the reference frequency being the (N−1)-th frequency that is less than the N-th frequency, N being a natural number.

6. The processor of claim 5, wherein when the calculated power consumption is less than a threshold power consumption of the operation unit, the frequency controller is configured to change the operating frequency to the N-th frequency.

7. The processor of claim 5, wherein the first through N-th frequencies are configured to be changed by a value preset by a user.

8. The processor of claim 1, wherein when the calculated power consumption is less than a threshold power consumption of the operation unit, the frequency controller is configured to change the operating frequency to a maximum operating frequency of the operation unit.

9. The processor of claim 8, wherein when the operation unit operates at the maximum operating frequency and when the calculated power consumption is greater than the threshold power consumption, the frequency controller is configured to change the operating frequency to a frequency that is less than the maximum operating frequency.

10. The processor of claim 1, wherein the frequency controller is configured to change the operating frequency to a maximum operating frequency of the operation unit when the measured power consumption and the calculated power consumption are less than a threshold power consumption of the operation unit.

11. The processor of claim 10, wherein when the operation unit operates at the maximum operating frequency and when the calculated power consumption or the measured power consumption is greater than the threshold power consumption, the frequency controller is configured to change the operating frequency to a frequency that is less than the maximum operating frequency.

12. The processor of claim 1, wherein the first operation is an arithmetic operation, the second operation is a memory operation, the operation counter comprises an arithmetic operation counter configured to count executions of the arithmetic operation by the operation unit and a memory operation counter configured to count executions of the memory operation by the operation unit.

13. A semiconductor device comprising:

a processor; and a processor power meter configured to measure first power consumption which is measured power consumption of the processor, wherein the processor comprises:

a section counter configured to measure an active section and an idle section of the processor;

a utilization measurement unit configured to calculate an operating rate of the processor using a result value of the section counter;

a frequency controller configured to adjust an operating frequency of the processor using the operating rate and the first power consumption;

an operation counter configured to measure a first operation pattern by counting first operations and to measure a second operation pattern by counting second operations which are different from the first operations; and a power management unit configured to calculate second power consumption by using a first weight for the first operation pattern and a second weight for the second operation pattern, the second power consumption being calculated power consumption of the processor, wherein the frequency controller is configured to adjust the operating frequency of the processor using the calculated second power consumption, wherein the frequency controller is configured to receive measured power consumption of the operation unit directly from the processor power meter, and wherein the power management unit is configured to operate when the operating frequency is greater than or equal to a reference frequency of the operation unit, the reference frequency being set to a frequency that is less than a maximum operating frequency of the operation unit.

14. A semiconductor device comprising:

an operation unit;

a memory;

an operation counter configured to measure a first rate at which an arithmetic operation is executed by counting executions of the arithmetic operation by the operation unit during a time period and to measure a second rate at which a memory operation of the memory is executed by counting executions of the memory operation by the operation unit during the time period;

a power measurement unit configured to calculate power consumption of the operation unit using the first and second rates; and a frequency controller configured to adjust an operating frequency of the processor using the calculated power consumption.

15. The semiconductor device of claim 14, wherein the memory is a cache, and the memory operation is a cache operation.

16. The semiconductor device of claim 14, wherein the power measurement unit calculates the power consumption by applying a first weight to the first rate and a second rate to the second rate, where the first weight is different from the second weight.

17. The semiconductor device of claim 16, wherein the first weight is higher than the second weight when the arithmetic operation consumes more power than the memory operation, and the second weight is higher than the first weight when the memory operation consumes more power than the arithmetic operation.

18. The semiconductor device of claim 16, wherein the power measurement unit calculates the power consumption by multiplying the first rate by the first weight to generate a first value, multiplying the second rate by the second weight to generate a second value, and summing the first and second values.

19. The semiconductor device of claim 14, wherein when the calculated power consumption is less than a threshold power consumption of the operation unit, the frequency controller is configured to change the operating frequency to a maximum operating frequency of the operation unit.

20. The semiconductor device of claim 19, wherein when the operation unit operates at the maximum operating frequency and when the calculated power consumption is greater than the threshold power consumption, the frequency controller is configured to change the operating frequency to a frequency that is less than the maximum operating frequency.

* * * * *